United States Patent Office 2,846,448
Patented Aug. 5, 1958

2,846,448

ORGANOSILICON DIOXOLANES

John L. Speier, Pittsburgh, Pa., assignor to Dow Corning Corporation, Midland, Mich., a corporation of Michigan No Drawing. Application August 15, 1956
Serial No. 604,058

9 Claims. (Cl. 260—340.9)

This invention relates to certain dioxolane substituted organosilicon compounds, i. e. compounds in which at least some of the silicon atoms are attached to a radical of the type

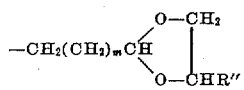

where $m$ is an integer of from 1–16 inclusive and $R''$ is an alkyl radical of from 1–3 inclusive carbon atoms.

It is an object of this invention to provide novel organosilicon compounds which have new and unusual properties in their own right as fluid and resinous materials. Another object is to provide organosilicon intermediates which are easily converted to aldehyde substituted organosilicon compounds, said intermediates being obtainable by economical means and in a high yield without resorting to the use of special high pressure equipment. A further object is to provide organosilicon intermediates which can be easily converted to aldehyde substituted organosilicon compounds having a wide range of degrees of substitution (i. e. total organic group/Si ratios).

The products of this invention can take the form of monomers, polymers or copolymers containing the above defined dioxolane substituents. More specifically, the 3 types of products within the scope of this invention take the form of:

(1) Compounds of the formula

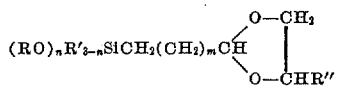

where $R$ and $R'$ are monovalent hydrocarbon radicals free of aliphatic unsaturation, $R''$ is an alkyl radical of from 1–3 inclusive carbon atoms, $n$ is an integer of from 0–3 inclusive, and $m$ is an integer of from 1–16 inclusive.

(2) Organosiloxanes consisting essentially of units of the formula

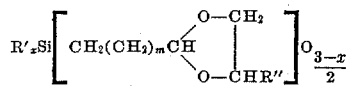

where $R'$ and $m$ are as above defined and $x$ is an integer of from 0–2 inclusive.

(3) Copolymeric organosiloxanes consisting essentially of the units as defined in (2) and units of the formula

where $R^3$ is selected from the group consisting of monovalent hydrocarbon radicals and halogenated monovalent hydrocarbon radicals and $y$ is an integer of from 0–3 inclusive.

The monomeric products of this invention can be obtained by reacting a hydrogenosilane of the formula $R'_{3-n}SiH(OR)_n$ where $R$, $R'$, and $n$ are as above defined, with a dioxolane of the formula

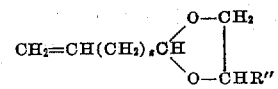

where $R''$ is as above defined and $z$ is an integer of from 0–15 inclusive, in the presence of either platinum deposited upon finely divided charcoal or chloroplatinic acid as a catalyst. With the former catalyst a reaction temperature of 100°–150° C. is preferable, whereas the latter catalyst promotes the reaction at room temperature and the resulting exothermic reaction can either be allowed to take its own course or can be subjected to occasional cooling in order to keep the reaction at any desired convenient operating temperature.

The polymeric and copolymeric siloxanes of this invention can be prepared by the hydrolysis of any one or more of the above described monomeric silanes of this invention which contain at least one of the defined (OR) radicals attached to each silicon atom, or by the cohydrolysis of any one or more of such monomeric silanes with monomeric silanes of the general formula $R^3_ySiX_{4-y}$ where $R^3$ and $y$ are as above defined, and X is a hydrolyzable radical such as Cl, Br, —OC$_2$H$_5$, etc.

Monomeric silanes of the latter type are well known, and many are commercially available materials. Their cohydrolysis with the monomeric silanes of this invention can be carried out by the conventional techniques known in the art, with the exception that where the products of this invention are desired as final products, acid conditions during hydrolysis are to be avoided in order to prevent the conversion of the dioxolane group to the corresponding aldehyde. For this reason it is preferable that the $R^3_ySiX_{4-y}$ material be one in which the hydrolyzable X substituent does not yield an acid upon hydrolysis, e. g. an alkoxy radical, amino group, hydrogen atom, and the like.

The polymers and copolymers of this invention can also be prepared by reacting a polymeric or copolymeric organosiloxane which contains at least one silicon bonded hydrogen atom per molecule (and in which the organic radicals will be the same as the $R'$ or $R^3$ radicals described above) with the defined dioxolane of the formula

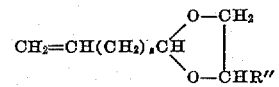

in the presence of chloroplatinic acid as the catalyst. Best results with the latter type of reaction can be obtained by employing a disiloxane reactant such as

which provides a reaction product in which both of the hydrogen atoms have been replaced by the particular dioxolane substituent employed. If desired, the latter reaction product can then be copolymerized with conventional organosiloxanes by the conventional and well known alkaline copolymerization techniques. A similar reaction can be carried out with $R'SiH_3$ as the silane reactant, followed by the hydrolysis of unreacted silicon bonded hydrogen.

Where platinum deposited upon finely divided charcoal is employed as the catalyst in the above described reactions, it is preferred that the catalyst itself contains from about 0.05 to 2 percent by weight of platinum. The catalytic mass is then preferably employed in an amount of from 0.5 to 2 percent by weight based on the weight of the organosilicon reactants. The chloroplatinic acid catalyst is preferably employed in a concentration from $1\times10^{-7}$ to $1\times10^{-3}$ mol per mol of the dioxolane reactant. To facilitate handling the small amounts required, a solution of the latter catalyst in a solvent (e. g. isopropanol) is preferred.

The R and R' radicals in the above described reactants and products are monovalent hydrocarbon radicals which are free of aliphatic unsaturation. Examples of suitable radicals of this type are alkyl such as methyl, ethyl, and octadecyl; alkaryl such as tolyl, aralkyl such as benzyl, cycloaliphatic such as cyclohexyl, and aryl such as phenyl and xenyl. The most preferred R radicals are methyl, ethyl, propyl, isopropyl and phenyl. The most preferred R' radicals are methyl, ethyl, and phenyl. As noted previously, the R'' radicals are alkyl radicals of from 1–3 inclusive carbon atoms (i. e. methyl, ethyl, propyl, or isopropyl radicals).

The copolymeric organosiloxanes of this invention include those which contain not only a mixture of various dioxolane substituted organosilicon units, and those which contain not only one or more of such units, but also one or more of the defined

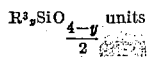

The latter type of copolymeric product preferably contains at least 1 mol percent of the defined dioxolane substituted siloxane units. The $R^3$ radicals can be monovalent hydrocarbon radicals and/or halogenated monovalent hydrocarbon radicals. Thus these radicals include not only those which have been described above in regard to the R and R' radicals, but also alkenyl radicals such as vinyl, allyl, octadecenyl, and cyclohexenyl, as well as halogenated hydrocarbon radicals such as mono- or dichlorophenyl, mono- or dibromophenyl, tetrafluoroethyl, $\alpha,\alpha,\alpha$-trifluorotolyl, tetrabromoxenyl, chlorocyclohexyl, and chlorovinyl radicals. The most preferred of the $R^3$ radicals are methyl, ethyl, and phenyl. It is also preferred that in the copolymers containing these conventional organosiloxane units, the latter units be present in amounts and in forms such that $y$ in the above formula will have an average value of from 0.5–3 inclusive. In other words, when $SiO_2$ polymeric units are present in the copolymer, sufficient $R^3SiO_{1.5}$, $R^3_2SiO$, or $R^3_3SiO_{.5}$ units should be present so that $y$ has an average value of at least 0.5. It is to be understood that the polymers and copolymers of this invention can contain small amounts (e. g. up to 2 or 3 percent by weight) of silicon bonded hydroxy and/or hydrocarbonoxy radicals, as is conventional in organosiloxane polymers.

The monomeric organosilanes of this invention are mostly fluid in nature, particularly where the organic substituents are of a relatively low molecular weight. Such materials can be used as lubricants, hydraulic fluids, and the like, and where they contain hydrolyzable substituents they can be used as treating agents to render various materials (such as paper, textiles, and masonry) water repellent. The monomeric silanes are of course also useful as intermediates in the production of the polymeric and copolymeric organosiloxanes of this invention. The polymers and copolymers can be either fluid or resinous in nature, depending upon the average degree of substitution of organic groups attached to silicon atoms, the degree of polymerization, and the size and type of the organic substituents attached to silicon. Ordinarily those materials which have an average of less than about 2 total organic groups attached to silicon per silicon atom are resinous in nature and can be used for molding compounds, impregnants, electrical insulating varnishes and the like.

A major utility of all of the products of this invention lies in the fact that the dioxolane substituents are easily ruptured in the presence of acids such as sulfuric and hydrochloric to yield the corresponding aldehyde substituted products of the type $\equiv SiCH_2(CH_2)_mCHO$. Compounds of the latter type are capable of reacting with phenols to form phenol-aldehyde type resins. Most of such aldehyde substituted compounds can not be prepared by methods known to the prior art.

The following examples are illustrative only. The symbols Me, Et, Pr and Ph are used herein to represent the radicals methyl, ethyl, propyl and phenyl respectively.

Example 1

A mixture of 0.5 mol of 2-vinyl-4-methyl-1,3-dioxolane,

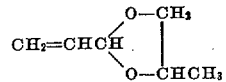

and 0.5 g. of a catalyst consisting of platinum deposited on finely divided charcoal and which contained 0.06 percent platinum by weight, was heated to 95° C. Over a period of one hour, 0.56 mol of $MeSiH(OEt)_2$ was added to the mixture, during which time the temperature was maintained at 110–120° C. When the addition was complete the reaction mass was heated for an additional 30 minutes at 120–140° C. The reaction product was then filtered and the filtrate distilled. The product was obtained in a yield of 66 percent of theoretical, and was the compound 2[2-(diethoxymethylsilyl)ethyl]-4-methyl-1,3-dioxolane, i. e.

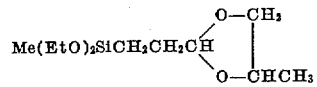

This compound had a boiling point of 126° C. at 15 mm. Hg, $n_D^{25}$ 1.4241, $d_4^{25}$ 0.9697. An analysis of the product showed 11.2 percent Si by weight as compared to the theoretical value of 11.3 percent. When this reaction is duplicated except that $MeSiH(OPh)_2$ is used as the silane reactant, the compound

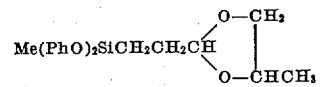

is obtained.

Example 2

When 0.56 mol of $PhEtSiH(OPr)$ and 0.5 mol of the dioxolane employed in Example 1 are reacted in the manner of that example, a product of the formula

is obtained.

Example 3

When $HSi(OEt)_3$ is employed as the silane reactant in the experiment of Example 1, the product

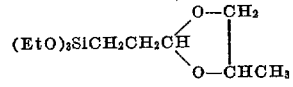

is obtained.

Example 4

When 0.55 mol of $Me_2PhSiH$ is added to 0.5 mol of the dioxolane of Example 1 in the presence of $3 \times 10^{-2}$ mol of benzoyl peroxide and the reaction mixture maintained at 100° C. for 16 hours, the compound

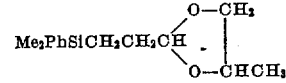

is obtained.

Example 5

When a mixture of 0.55 mol of $PhSiH_3$ and 0.5 mol of

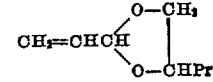

is heated at 100° C. for 12 hours in the presence of $5 \times 10^{-2}$ mol of t-butyl perbenzoate as a catalyst, the compound

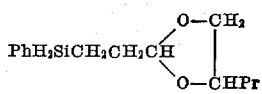

is obtained. When the latter product is mixed with an equal weight of diethyl ether and is then heated with 100 g. water containing 1 g. NaOH, an ether solution of a siloxane consisting essentially of units of the formula

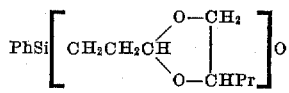

is obtained.

Example 6

A mixture of 1 mol of the dioxolane of Example 1 and $3 \times 10^{-5}$ mol chloroplatinic acid was prepared. To this mixture was added 0.55 mol of tetramethyldisiloxane, i. e. $Me_2HSiOSiHMe_2$. Occasional cooling of the system was necessary to keep the reaction temperature down to about 115° C. for a 30 minute period. The reaction product was then distilled and the product tetramethyldisiloxane-1,3-bis (2-ethyl-4-methyl-1,3-dioxolane), i. e.

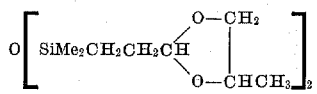

was obtained in a yield of 64 percent of the theoretical yield. This product had a boiling point ranging from 134 to 139° C. at about 2 mm. Hg, $n_D^{25}$ ranging from 1.4400 to 1.4420, and $d_4^{25}$ ranging from 0.980 to 0.987. Analysis showed 15.5 percent silicon, which was in exact agreement with the theoretical value.

Example 7

When the product

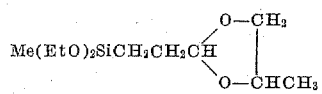

as obtained in Example 1, is dissolved in an equal weight of diethyl ether and is then hydrolyzed in an amount of water sufficient to furnish a 100 percent excess of the theoretical amount necessary for complete hydrolysis of the ethoxy radicals, there being a trace of $Ca(OH)_2$ present as a catalyst for the hydrolysis, a polymeric siloxane containing units of the formula

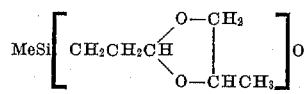

is obtained.

Example 8

When a mixture containing equimolar amounts of the silane employed in Example 7, $PhMeSi(OEt)_2$, $PhSi(OEt)_3$, and $MeSi(OEt)_3$ is hydrolyzed as in Example 7, a resinous copolymeric organosiloxane is produced which contains the units

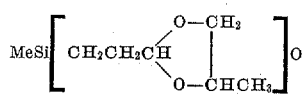

$PhMeSiO$, $PhSiO_{1.5}$, and $MeSiO_{1.5}$ in equimolar amounts.

Example 9

When the compound

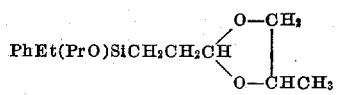

as produced in Example 2 is diluted with ether and hydrolyzed as in Example 7, a disiloxane fluid of the formula

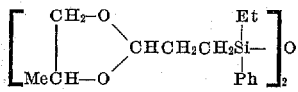

is obtained. When a mixture containing 1 mol of this same silane and 1 mol of $Cl_2C_6H_3(CH_3)Si(OEt)_2$ is hydrolyzed by the same method and the hydrolyzate is equilibrated by heating it at 160° C. with 0.1 percent by weight of powdered KOH, a viscous fluid of the formula

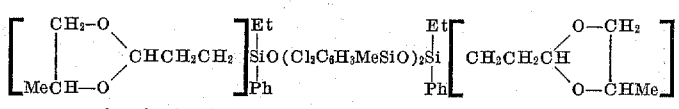

is obtained.

Example 10

When a mixture containing 3 mols of

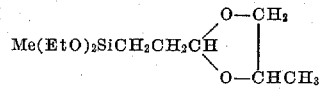

and 2 mols of $Me_3SiOEt$ is hydrolyzed and equilibrated by the method of Example 9, and the ether distilled from the hydrolyzate after washing said hydrolyzate free of catalyst, a viscous liquid is obtained which has the average formula

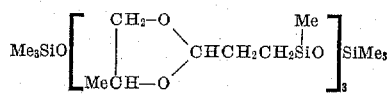

Example 11

When a mixture containing 2 mols of

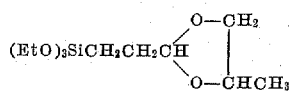

1 mol each of $Si(OEt)_4$, $PhSi(OEt)_3$ and $MeSi(OEt)_3$ and 5 mols of $PhMeSi(OEt)_2$ is diluted with ether and cohydrolyzed by the method of Example 7, the resulting product is a solution in ether of the resinous copolymeric organosiloxane containing units of the formula

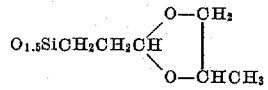

$SiO_2$, $PhSiO_{1.5}$, $MeSiO_{1.5}$, and $PhMeSiO$ in the molar ratio equivalent to the starting silanes.

Example 12

When a mixture of 0.5 mol of a dioxolane having the formula

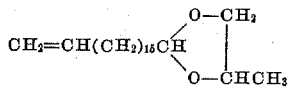

and 0.5 g. of the platinum catalyst of Example 1 is heated to 100° C. and 0.55 mol of $MeSiH(OEt)_2$ is added thereto, followed by maintaining the temperature at 150° C. for 30 minutes, a silane of the formula

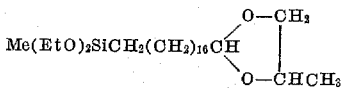

is obtained. The hydrolysis of this material by the method of Example 7 produces the corresponding siloxane.

That which is claimed is:

1. An organosilicon compound selected from the group consisting of (1) compounds of the formula

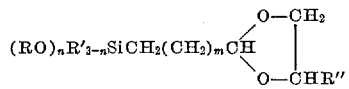

where R and R' are monovalent hydrocarbon radicals free of aliphatic unsaturation, R'' is an alkyl radical of from 1–3 inclusive carbon atoms, $n$ is an integer of from 0–3 inclusive, and $m$ is an integer of from 1–16 inclusive, (2) organosiloxanes consisting essentially of units of the formula

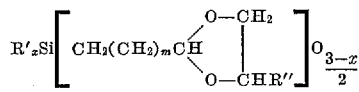

where R', R'', and $m$ are as above defined and $x$ is an integer of from 0–2 inclusive, and (3) copolymeric organosiloxanes consisting essentially of the units as defined in (2) and units of the formula

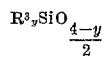

where $R^3$ is selected from the group consisting of monovalent hydrocarbon radicals and halogenated monovalent hydrocarbon radicals and $y$ is an integer of from 0–3 inclusive.

2. Organosilicon compounds of the formula

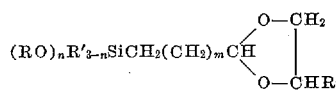

where R and R' are monovalent hydrocarbon radicals free of aliphatic unsaturation, R'' is an alkyl radical of from 1–3 inclusive carbon atoms, $n$ is an integer of from 0–3 inclusive, and $m$ is an integer of from 1–16 inclusive.

3. Organosilicon compounds of the formula

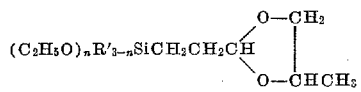

where R' is a radical selected from the group consisting of methyl, ethyl and phenyl radicals and $n$ is an integer of from 0–3 inclusive.

4. A compound of the formula

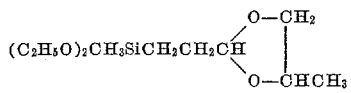

5. Organosiloxanes consisting essentially of polymeric units of the formula

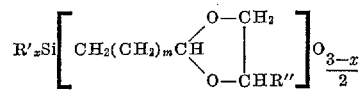

where R' is a monovalent hydrocarbon radical free of aliphatic unsaturation, R'' is an alkyl radical of from 1–3 inclusive carbon atoms, $m$ is an integer of from 1–16 inclusive, and $x$ is an integer of from 0–2 inclusive.

6. Organosiloxanes consisting essentially of polymeric units of the formula

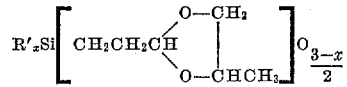

where R' is a radical selected from the group consisting of methyl, ethyl, and phenyl radicals and $x$ is an integer of from 0–2 inclusive.

7. An organodisiloxane of the formula

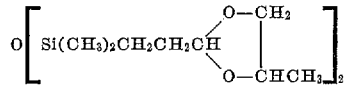

8. Copolymeric organosiloxanes consisting essentially of units of the formula

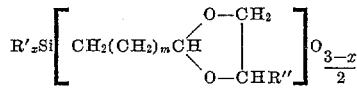

where R' is a monovalent hydrocarbon radical free of aliphatic unsaturation, R'' is an alkyl radical of from 1–3 inclusive carbon atoms, $x$ is an integer of from 0–2 inclusive, and $m$ is an integer of from 1–16 inclusive, and units of the formula

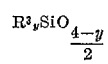

where $R^3$ is a monovalent hydrocarbon radical and $y$ is an integer of from 0–3 inclusive.

9. Copolymeric organosiloxanes consisting essentially of polymeric units of the formula

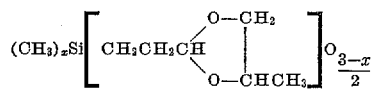

where $x$ is an integer of from 0–2 inclusive, and units of the formula

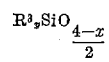

where $R^3$ is a radical selected from the group consisting of methyl, ethyl and phenyl radicals and $y$ is an integer of from 0–3 inclusive, the average value of $y$ in said copolymer being from 0.5 to 3 inclusive.

References Cited in the file of this patent

UNITED STATES PATENTS

| | | |
|---|---|---|
| 2,588,083 | Burkhard et al. | Mar. 4, 1952 |
| 2,684,373 | Patrick | July 20, 1954 |
| 2,695,318 | Thiele | Nov. 23, 1954 |

UNITED STATES PATENT OFFICE
CERTIFICATE OF CORRECTION

Patent No. 2,846,448                                      August 5, 1958

John L. Speier

It is hereby certified that error appears in the printed specification of the above numbered patent requiring correction and that the said Letters Patent should read as corrected below.

Column 3, line 16, for "contain not only" read -- contain only --; column 4, line 16, the formula should read as shown below instead of as in the patent --

$$MeSiH(OEt)_2$$

column 8, line 45, the formula should appear as shown below instead of as in the patent --

$$R^3_y SiO_{\frac{4-y}{2}}$$

Signed and sealed this 11th day of November 1958.

(SEAL)
Attest:
KARL H. AXLINE

Attesting Officer

ROBERT C. WATSON
Commissioner of Patents